Figure 3:
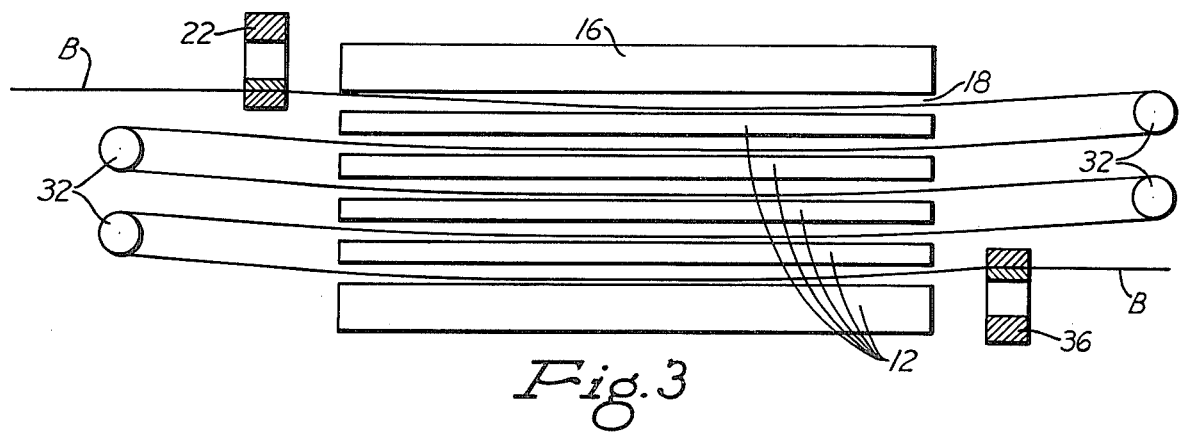

United States Patent [19]

George

[11] 4,094,619
[45] June 13, 1978

[54] APPARATUS FOR STRETCHING AND STRIPPING BELTING IN A MULTIPLATEN PRESS

[75] Inventor: David Weinschenk George, New Castle, Pa.

[73] Assignee: Wean United, Inc., Pittsburgh, Pa.

[21] Appl. No.: 716,329

[22] Filed: Aug. 20, 1976

[51] Int. Cl.² .............................................. B29H 7/22
[52] U.S. Cl. .................... 425/135; 425/338; 425/339
[58] Field of Search .............. 425/28 B, 135, 330, 425/338, 339, 343, 383, 394, 445, 446, 149, 139, 136, 195

[56] References Cited

U.S. PATENT DOCUMENTS

| 3,236,176 | 2/1966 | Fischer | 100/195 |
| 3,278,992 | 10/1966 | Strauss | 425/136 |
| 3,579,741 | 5/1971 | Schwartz | 425/149 |
| 3,647,309 | 3/1972 | Thompson | 425/139 |
| 3,647,342 | 3/1972 | Hunt | 425/394 X |
| 3,667,884 | 6/1972 | Reinfeld | 425/149 |
| 3,868,204 | 2/1975 | Bongers | 425/339 X |
| 3,936,258 | 2/1976 | Lake | 425/135 |
| 3,964,851 | 6/1976 | Bongers | 425/339 X |

Primary Examiner—J. Howard Flint, Jr.
Attorney, Agent, or Firm—Daniel Patch; Suzanne Kikel

[57] ABSTRACT

This disclosure includes entry and delivery clamps arranged on opposite sides of a multiplaten press for clamping belting in order to apply a tension to the belting prior to pressing. The tension is applied by moving the entry clamp in a direction away from the press. The belting is fed over support rollers on opposite sides of the press which receive the belting from different openings of the press. These rollers are caused to move before the press is closed to maintain the belting away from the hot platens of the press, then moved in concert with and in the direction of the platens during pressing and then, if required, they may be moved independent of the platens when the press has been opened after pressing to effect a stripping of the belting from the platens.

7 Claims, 10 Drawing Figures

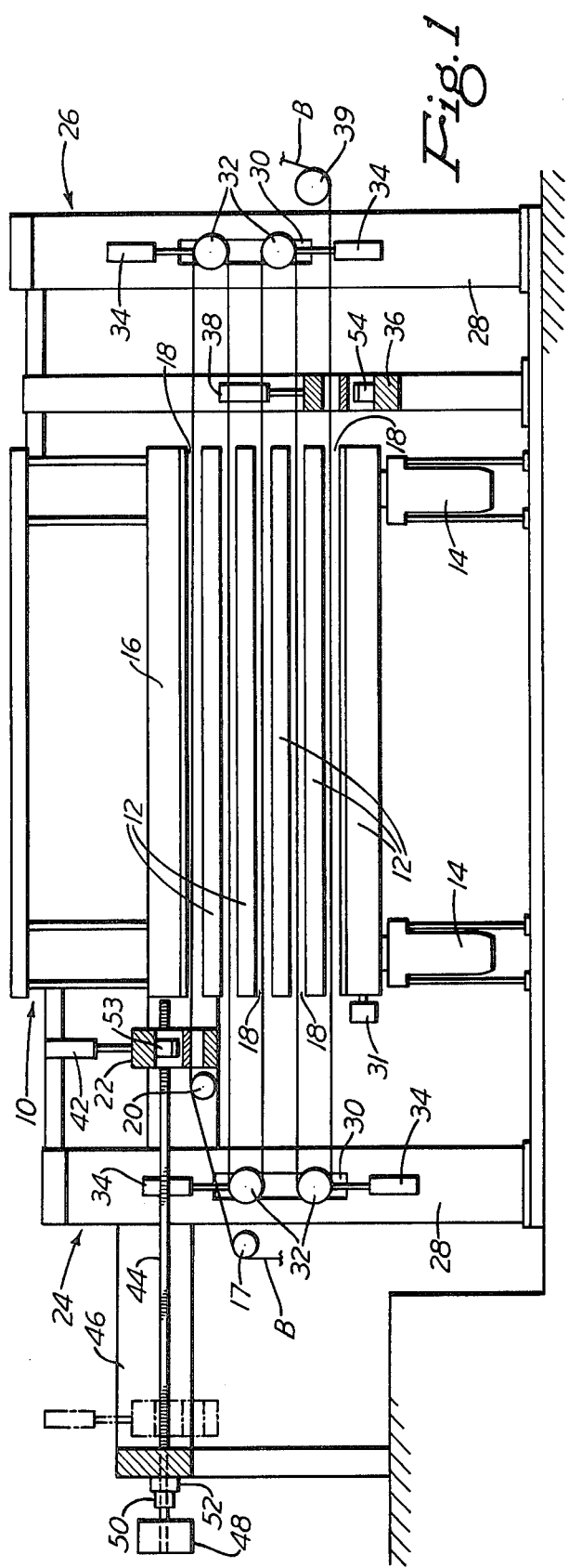
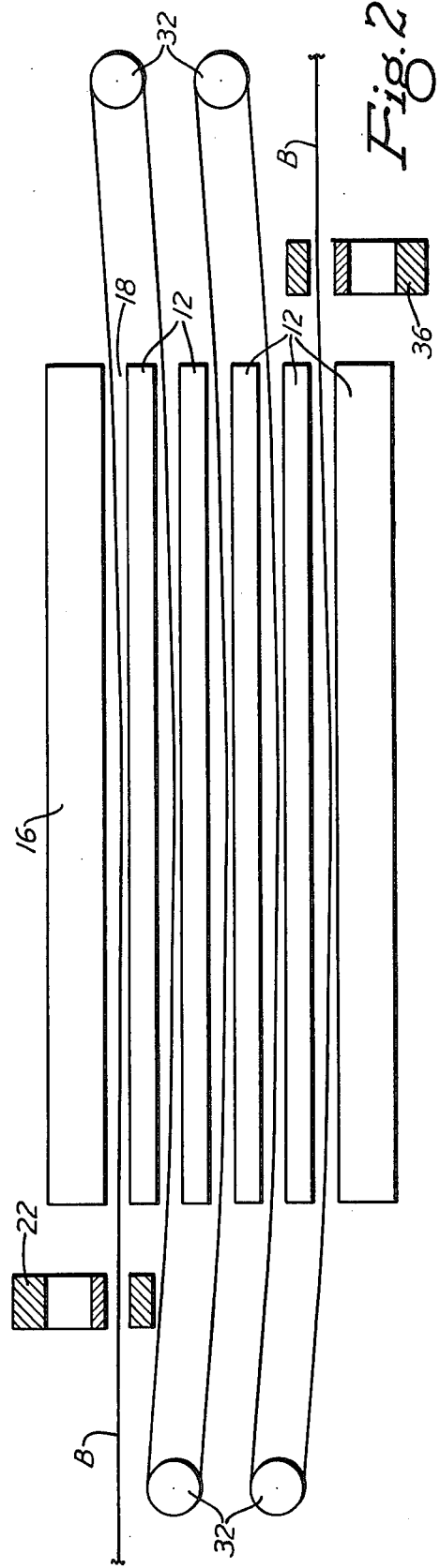

APPARATUS FOR STRETCHING AND STRIPPING BELTING IN A MULTIPLATEN PRESS

It is well known in the art of manufacturing continuous vulcanized rubberized belting products to employ various combinations of clamping means and belt supporting rollers to impose a tension on the belting prior to pressing. An example of some of the prior forms may be found in U.S. Pat. Nos. 2,250,335, 3,619,332, 3,647,342 and 3,236,176. U.S. Pat. No. 3,619,332 employs sandwich type clamps which, as pointed out in U.S. Pat. No. 3,236,176, possesses the disadvantage of creating deflections in the belting resulting in the attending problems of unequal tension and objectionable contact of the belting with the edges of the platens due to the deflection of the belting. U.S. Pat. No. 3,236,176 sought to solve these disadvantages for providing the movement of the clamps in concert with the pressing platens during pressing in an attempt to reduce or to avoid deflection of the belting.

The prior art, however, made no provision for maintaining the belting away from the hot platens during the feeding of the belting so that on contact objectionable surface marking occurred. Nor did the prior art teaching provide an effective simple procedure for stripping the belting from the platens when upon completion of the pressing operation, the belting adhered to the platens.

One attempt to provide a means for stripping the belting from the platen is found in U.S. Pat. No. 1,626,419. In addition to necessitating cumbersome equipment, this prior design also greatly complicated the press design and obstructed the operator's view from the openings of the press.

In prior arrangements there was no simple efficient method and apparatus for allowing the belting to be stretched either a percent of its total length between the clamps or to subject the belting to a direct tension, e.g., selected lb. forces per inch of width. Moreover, past arrangements in applying the stretching force to the belting move the stretching means varying distances so that a proper registry or equality of cured lengths and uncured lengths could not be maintained. As a result, certain portions of the continuous belting were overcured while others were undercured, particularly the portions that were positioned adjacent the edges of the platens.

In the pressing arrangement employing the so-called sandwich type clamps, as illustrated in the aforesaid U.S. Pat. No. 3,236,176, when it was desired to apply a direct tension to the belting, it was not possible to subject the cured and green portions of the belting to an equal tension since portions of the belting were arranged outside the clamps and, therefore, not subject to the tension force. Lastly, there was no simple, convenient and dependable arrangement in the past to measure the tension applied to the belting.

It is, therefore, an object of the present invention to provide in a multi-opening platen press for vulcanizing striplike material, such as, rubberized belting, a simple, dependable arrangement and procedure for feeding, tensioning and stripping the belting.

It is a further object of the present invention to provide an improved clamping arrangement whereby belting tension is applied by moving one of the clamps away from the press, in which the belting is supported over two roller supporting units which are employed to assure that the belting is maintained out of contact with the press platens during the feeding of the belting to the press, also allowing maintenance of the belting in nondeflected condition relative to the platens during pressing and then stripping of the belting from the platens after pressing has been completed.

More particularly, the present invention provides an apparatus for tensioning and stripping belting of a three or more opening platen press adapted to process belting fed in a continuous manner through said press and having different succeeding portions arranged between said openings, and steps comprising:

feeding belting in a continuous manner through said press openings on which the belting is caused on the entry and delivery sides of said press to pass around in a supporting relationship with belting supporting means as the belt passes from one press opening to another, clamping a portion of said belting adjacent to and external of the entry side of said press, clamping a portion of said belt external to and adjacent of the delivery side of said press, effecting a movement of said clamped entry portion of said belting in a direction away from said press to tension the portion of the belting between said clamped portions, causing said supporting means to move in concert with said press platens during the closing of said press, and upon completion of said pressing operation causing said supporting means to move relative to and independent of said press platens during and/or after opening to effect a stripping of the belting from said platens upon the adherence of belting thereto.

The present invention provides an apparatus for applying both a percentage stretch or a direct tension to the belting and in a manner, when applying a percentage tension, that all portions of the belting will be subject to an equal tension and in which a proper registry will be maintained between the cured and uncured portions of the belting.

A still further object of the invention is to provide a simple, efficient and accurate arrangement for measuring the tension in the belting.

These objects and advantages of the present invention will become better appreciated when the following description is read along with the accompanying drawings of which:

FIG. 1 is a diagrammatically elevational view of a five-opening vulcanizing press for continuous belting, and FIGS. 2 through 10 are a series of elevational sequence views of the apparatus illustrated in FIG. 1.

In referring to FIG. 1, it will be appreciated by those skilled in the art of manufacturing and operating belting presses that the details of most of the equipment illustrated and their operation are well know as exemplified in the aforesaid patents. In view of this, only the details of the equipment and their method of operation that are necessary to understand the features of the present invention will be emphasized.

Starting with the press itself, there is shown a 5-opening multiplaten vulcanizing press 10 having a series of displaceable platens 12 which are raised and lowered by piston cylinder assemblies 14 against each other and, finally, against a stationary platen 16 arranged at the top of the press. The press is shown in its open condition in which the platens 12 are separated by openings 18 and into which 5 strands of a continuous belting B have been fed.

Turning to the entry side of the press, which is on the left as one views FIG. 1, the belting is supplied by a let-off device not shown passed over rollers 17 and 20 and into an entry clamp 22. The clamp shown in this stage of the operation is in its pretension position which is the full line position shown in FIG. 1. The belting is then passed between preheated platens 12 and through openings 18 formed thereby without touching the adjacent surface of the heated platens. This desired condition is assured by entry and delivery supporting roller units 24 and 26 and, more particularly, by their controlled vertical movements. Each unit 24–26 consists of a frame 28 having an opening 30 for receiving two spaced-apart, freely rotatable belting supporting rollers 32 which are ideally located across from adjacent press openings 18 and adjustable vertically as a unit or independently by a piston cylinder assembly 34, similar in design to piston cylinder assemblies 38. These piston cylinder assemblies are of the type known as linear electro-hydraulic pulse drives, such as manufactured by Olsen Controls, Inc., of Plantsville, Conn., which operate from a digital input pulse signal. A pulse generator 31 associated with the lower platen 12 of the press initiates the required platen position signal. The rollers 32 of the belting stretching units 24–26 are staggered relative to each other to accommodate five belting strands fed through the openings 18 of the press.

At the delivery side of the press which is on the right as one views FIG. 1, there is provided a delivery clamp 36 having a piston cylinder assembly 54 for displacing a movable clamping member against a stationary member to effect a clamping of the belt. From the clamp 36, the belting passes over a roller 39 and onto a windup device not shown. Returning to the entry clamp 22, this clamp also includes a piston cylinder assembly 53 for displacing a movable member against a stationary member to effect clamping of the belting external of the entry side of the press 10. The clamp 22 also has a piston cylinder assembly 42 such as the piston cylinder assembly 38 for moving the entire clamp as a unit vertically. In addition the entry clamp is provided to be displaced horizontally away from the press by a pair of parallel drive screws 44, guiding tracks 46 and motor-gear unit 48. The ends of the screws remote from the press are received in thrust bearings 50 with which load cells 52 are associated in a manner to accurately measure the tension of the screws 44 and, hence, the tension imposed to the belting by the entry clamp 22. FIG. 1 shows in phantom the full extension of the entry clamp 22.

In briefly describing one operational sequence of the equipment described above as illustrated, the sequence drawings of FIGS. 2–10, FIG. 2 illustrates the completely open condition of the press. In this position the piston cylinder assemblies 34 of units 24–26 have been operated to position the rollers 32 in their proper threading position whereby the belting, when threaded through the openings 18, is maintained away from the preheated surfaces of the platens 12. To better appreciate the operational sequence of FIG. 2, it will be understood that in the position shown there are unvulcanized portions of belting in the press and vulcanized portions external of the press and supported by the rollers 32.

Figure 4:
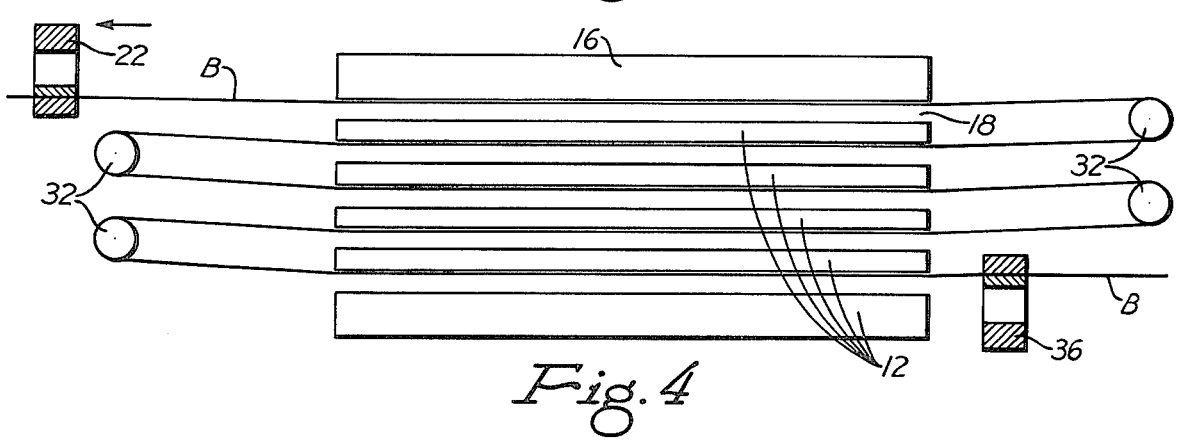

In FIG. 3 the piston cylinder assemblies associated with the entry and delivery clamps 22 and 36, namely, piston cylinder assemblies 53 and 54 respectively, are operated to clamp the belting between the two clamps, it being understood that in this position the entry clamp 22 is in its position adjacent the press. After this process and as indicated in FIG. 4, the entry clamp is displaced to the required stretch position to impose the necessary tension on the belting. In the case where a percent stretch of the total length of the belting is required, the entry clamp is simply positioned linearly the amount equal to the percent increase in length. If it is desired to subject the belting to a direct tension, then the entry clamp is displaced by the motor-gear unit 48 until the load cells 52 measures the required direct tension. It will be observed, particularly in applying a percent stretch to the belting that the disclosed arrangement allows the application of tension to both the cured and uncured portions in the press and in a manner that the lengths of uncured belting are always maintained at the proper length so that proper registry will occur when the uncured lengths in the next press sequence are advanced from the outside of the press in between the platens where they will be vulcanized.

Figure 5:
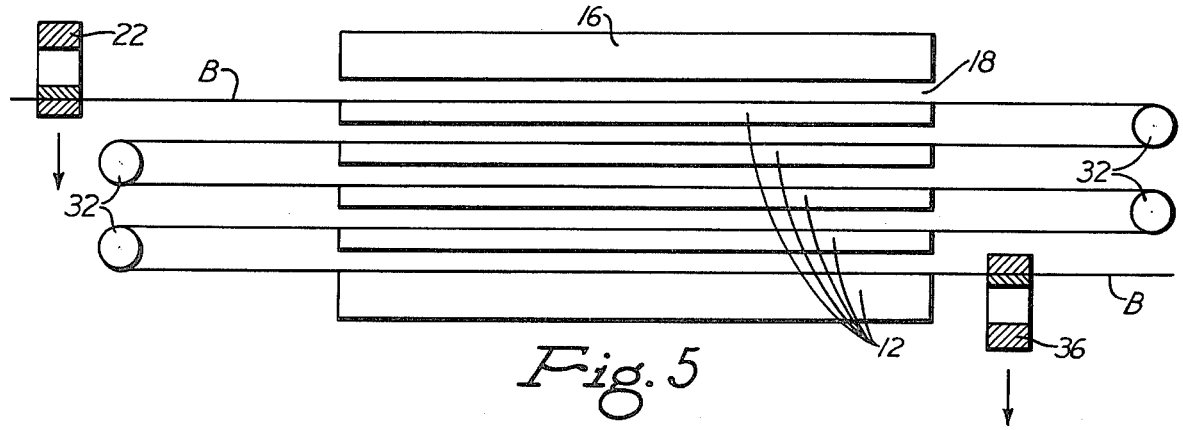

In FIG. 5 the rollers 32 by operation of the piston cylinder assemblies 34 have been lowered along with the delivery clamp 36; thereby to place the belting evenly on the adjacent surfaces of the platens 12, at the same time piston cylinder assemblies 38 and 42 are operated to lower the clamp 22 and 36 as indicated by the arrows. One of the features of the present invention is that in this position the operator has ready access to inspect the openings to see that the belting is in proper relationship to the platens and in fact, these elements are required for molded edge belting.

Figure 6:
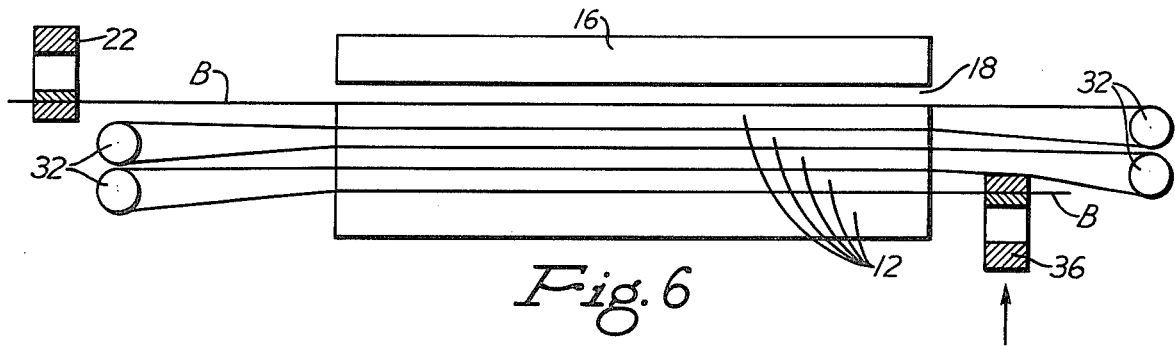
Figure 7:
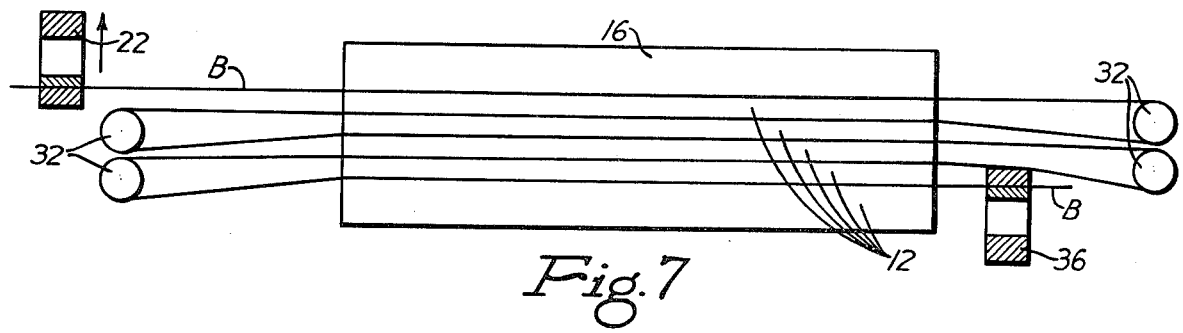

FIG. 6 illustrates the commencement of the closing of the press, in which regard as the platens are raised by operation of the piston cylinder assemblies 14, the delivery clamp 36 along with the rollers 32 are raised at the same rate, which is referred to as the tracking of the belting outside the press with the displacement of the belting within the press. FIG. 7 shows the press completely closed in which the delivery clamp 36 and the rollers 32 are in highest position and the clamp 22 has been raised.

Figure 8:
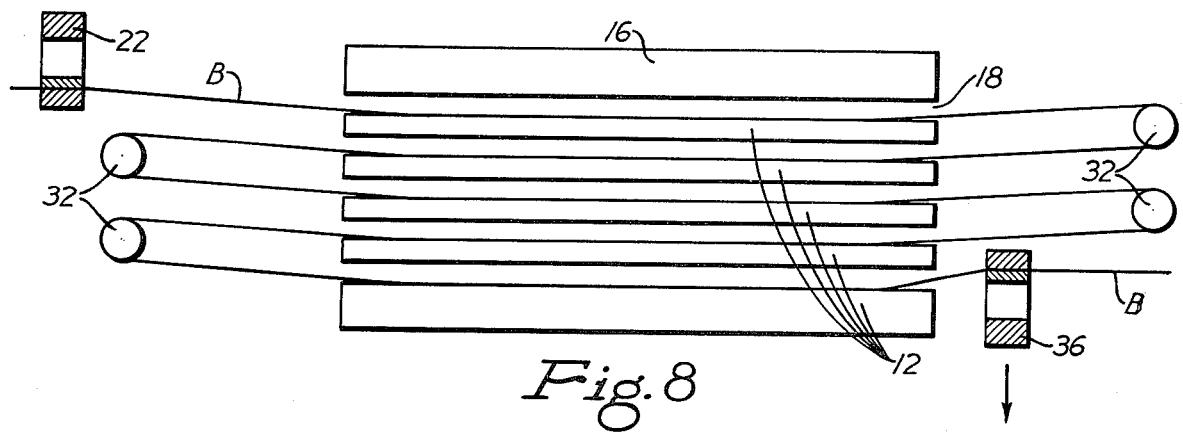

In FIG. 8 the vulcanizing has been completed, the platens 12 have been lowered and separated. In this condition the delivery clamp 36 and the rollers 32 have been moved down to the position shown as compared to their positions in FIG. 7. If the belting for some reason does not release itself from the platens 12, the rollers 32 can be moved vertically, either up or down, to pull the belting away from the platens.

Figure 9:
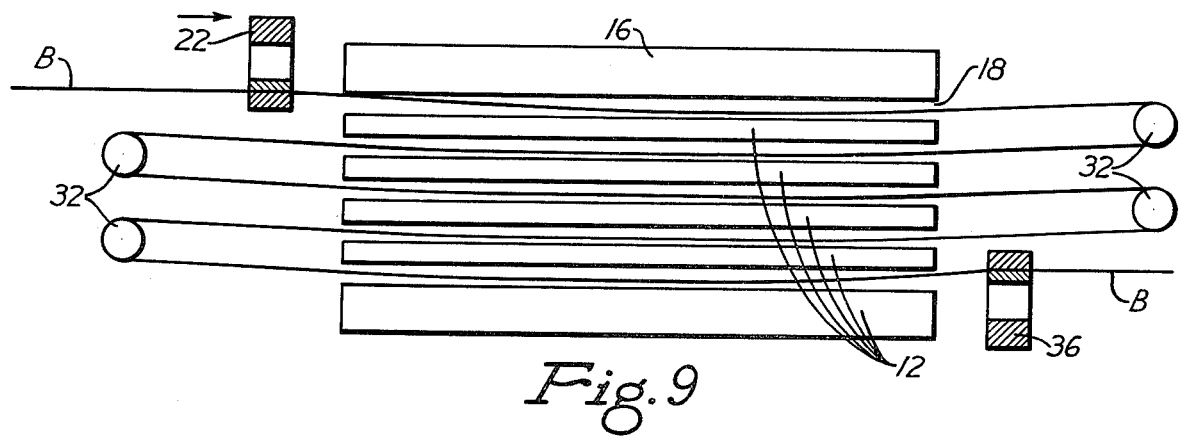
Figure 10:
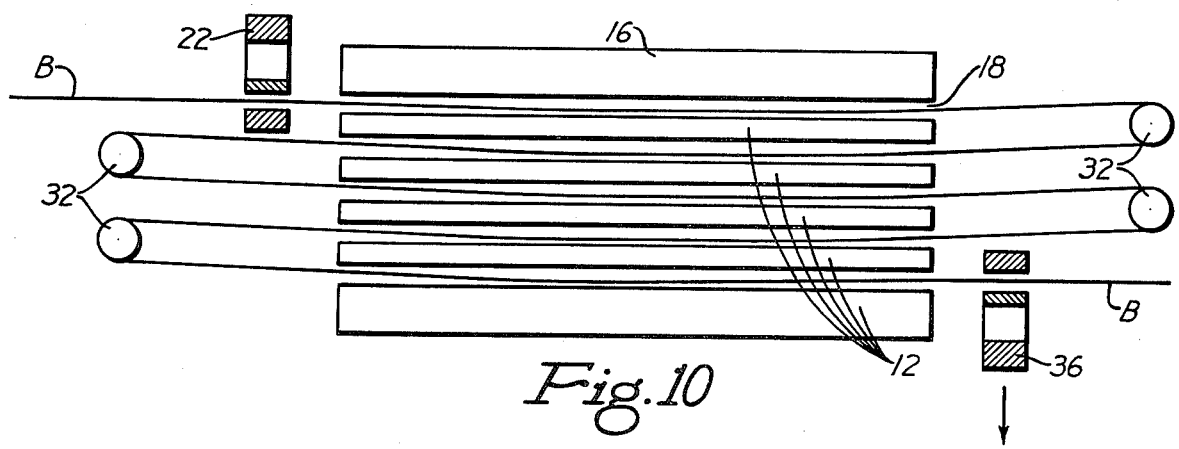

In FIG. 9 the entry side clamp 22 has been returned to its position adjacent the press 10, and the clamp 36 has been again lowered, and in FIG. 10 both the clamps 22–36 are shown in their release position preparatory to threading the belting through the press, whereby the uncured portions will be positioned between the platens for processing.

In accordance with the provisions of the patent statutes, I have explained the principle and operation of my invention and have illustrated and described what I consider to represent the best embodiment thereof.

I claim:

1. In combination with a three or more movable platen press for processing belting, fed in a continuous manner through openings formed by the platens of the press and having alternate belting portions arranged between said openings, entry and delivery tensioning devices for the belting comprising:

entry clamping means arranged adjacent the entry side of said press, delivery clamping means arranged adjacent the delivery side of said press, means for moving said entry clamping means to effect a clamping of a portion of the belting fed into said entry clamping means and for moving said entry clamping means, said entry and delivery tensioning devices arranged on the entry and delivery sides of the press and including belting supporting means for receiving different portions of the belting from different openings of the press during said feeding and for supporting the belting during said tensioning, means for mounting said belting supporting means relative to said press so as to only be movable in a direction parallel to the movement of said press platens, and means for selectively moving said belting supporting means in said direction parallel to said movement of said press platens, in concert with said press platens and independently of said press platens.

2. In combination with a press according to claim 1 wherein said selective moving means includes means for moving said belting supporting means prior to closing said press platens in a manner to maintain the belting out of contact with said platens during the feeding of the belting through said press openings.

3. In combination with a press according to claim 1, wherein said selective moving means also includes a means sensitive to the movement of said platens and for producing an electrical pulse signal representative thereof.

4. In combination with a press according to claim 1 wherein said means for moving said entry clamping means includes means for applying to succeeding given lengths of said belting the same percentage elongation or the same given unit tension.

5. In combination with a press according to claim 1 further comprising means for mounting said delivery clamping means so as to always be maintained in a fixed spaced relationship relative to said press.

6. In combination with a press according to claim 4 wherein said means for applying a unit tension includes means for producing a signal representative of the tension generated thereby on said belting.

7. In combination with a press according to claim 6, wherein said means for producing a tension representation signal includes a load cell means associated with a screw driven means provided to impart movement to said entry clamping means.

* * * * *